Oct. 24, 1950     M. HILLERY     2,526,661

ADJUSTABLE CABLE CLAMP

Filed Feb. 21, 1946

Inventor
MARIANA HILLERY

By M.O. Hayes

Attorney

Patented Oct. 24, 1950

2,526,661

UNITED STATES PATENT OFFICE 2,526,661

ADJUSTABLE CABLE CLAMP

Mariana Hillery, United States Navy

Application February 21, 1946, Serial No. 649,444

1 Claim. (Cl. 24—136)

(Granted under the act of March 3, 1883, as amended April 30, 1928; 370 O. G. 757)

This invention is directed to an adjustable cable clamp and is particularly adaptable for use where frequent repositioning and readjustment of a cable is necessary.

An object of this invention is to provide an adjustable cable clamp by means of which a length of a cable or rope can be securely clamped into any desired position for a specific use.

Another object is to provide an adjustable cable clamp which can be released from a previous position and readjusted for further use in a different position, or with a cable of different length.

Details of the invention are described in connection with the following drawings in which Fig. 1 is a top plan view of the cable clamp housing;

Figure 1:
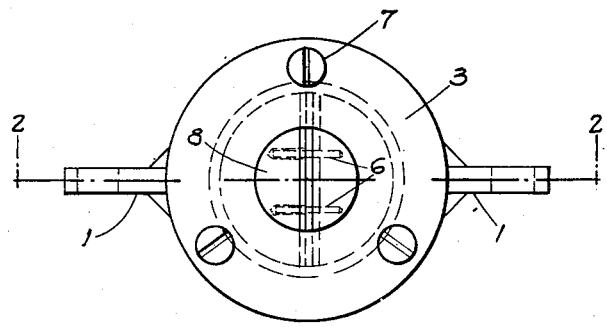

The present cable clamp consists of a cable clamp housing 2 which is preferably of cast metal but may be otherwise constructed without departing from the scope of the invention. Clamp housing 2 is substantially of truncated conical shape, as shown, and is provided with housing lugs 1 projecting therefrom. These are preferably attached by welding.

Stop plate 3 covers the large end of clamp housing 2 and is attached thereto by any suitable means such as rivets or screws 7. Stop plate 3 is provided with a circular hole 8 for a purpose later described.

Figure 2:
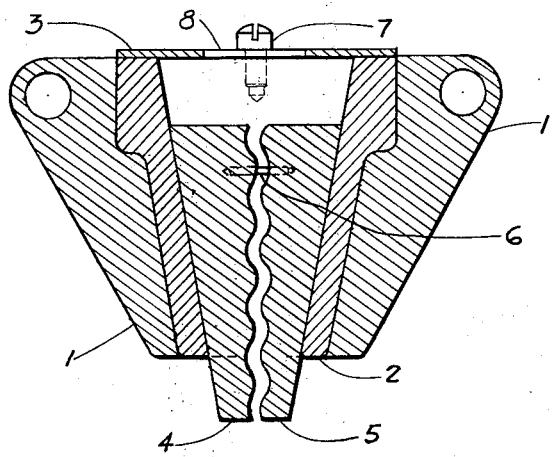
Fig. 2 is a sectional view taken on line 2—2 of Fig. 1.
Figure 3:
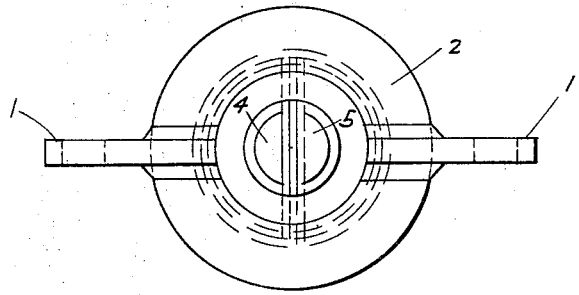
Fig. 3 is a bottom plan view of Fig. 2.

Two jaws 4 and 5 are received by clamp housing 2, as shown, in Fig. 2. These jaws have a curved outer surface corresponding to that of the conical inner surface of clamp housing 2. The two jaws when joined together will therefore form a truncated cone adapted to be received by conical clamp housing 2. Consequently, each of the jaws forms a section of the truncated cone. In the modification shown, two jaws are used. However, it will be apparent that more than two jaws may be used without departing from the scope of the invention. The inner contiguous jaw surfaces are preferably corrugated or knurled to furnish a satisfactory grip on the cable or rope. Dowels 6 and corresponding sockets in the contiguous gripping surfaces tend to maintain proper vertical alignment between the jaw sections. In the particular modification shown, the dowels are spaced apart.

In operation, the jaws are pushed up toward stop plate 3, thereby enlarging the gripping space between the jaws. The cable is passed through stop plate 3 down between jaws 4 and 5 and out the other end of the clamp housing 2. Tension applied to the cable in the direction of the small end of the housing causes the jaws to automatically grip the cable. In order to release the cable, it is necessary only to tap the jaw ends in a direction of the stop plate, thereby again enlarging gripping space between the jaws.

It will be apparent that the cable clamp may be designed to accommodate a cable, rope, or rod of any desired size and has a wide variety of uses.

The invention described herein may be manufactured and used by or for the Government of the United States of America for governmental purposes without the payment of any royalties thereon or therefor.

What is claimed is:

A cable clamp comprising a housing having a conical bore therethrough, two similar clamping jaws which together form an independent divided cone positioned for slidable movement within said housing, dowel means for holding said jaws in complementary relationship, and support means for said housing, said jaws each having outer tapered surfaces complementary to the inner wall surfaces of said bore and inner adjoining complementary surfaces formed of an extended series of alternating straight ridges and grooves of flattened and sinuous contour transverse to the bore axis, with the ridges of each jaw face interfitting with adjoining grooves of the other jaw face, the number of ridges on each jaw face being sufficient to produce cable bite readily without application of external force other than the movement of the cable itself and the depth and spacing of said ridges being such as to produce physical deformation in the cable axis after the bite has taken effect.

MARIANA HILLERY.

REFERENCES CITED

The following references are of record in the file of this patent:

UNITED STATES PATENTS

| Number | Name | Date |
|---|---|---|
| 1,400,940 | Clarke | Dec. 20, 1921 |
| 1,469,894 | Clarke | Oct. 9, 1923 |
| 1,504,087 | Brady | Aug. 5, 1924 |
| 1,810,106 | Johnsen | June 16, 1931 |
| 1,867,084 | Lewis et al. | July 12, 1932 |
| 1,945,438 | Landahl | Jan. 30, 1934 |

FOREIGN PATENTS

| Number | Country | Date |
|---|---|---|
| 27,563 | Great Britain | Jan. 19, 1905 |